US006738745B1

(12) United States Patent
Navratil et al.

(10) Patent No.: US 6,738,745 B1
(45) Date of Patent: May 18, 2004

(54) METHODS AND APPARATUS FOR IDENTIFYING A NON-TARGET LANGUAGE IN A SPEECH RECOGNITION SYSTEM

(75) Inventors: Jiri Navratil, White Plains, NY (US); Mahesh Viswanathan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/544,678

(22) Filed: Apr. 7, 2000

(51) Int. Cl.7 .............................................. G10L 15/08
(52) U.S. Cl. ........................... 704/277; 704/8; 704/240
(58) Field of Search ................................ 704/240, 277, 704/231, 257, 8, 3

(56) References Cited

U.S. PATENT DOCUMENTS

| 5,724,526 A | * | 3/1998 | Kunita ........................ 704/277 |
| 5,913,185 A | * | 6/1999 | Martino et al. ................. 704/8 |
| 6,047,251 A | * | 4/2000 | Pon et al. ....................... 704/1 |
| 6,061,646 A | * | 5/2000 | Martino et al. ................. 704/3 |
| 6,085,160 A | * | 7/2000 | D'hoore et al. ............. 704/256 |

FOREIGN PATENT DOCUMENTS

CA          2160184 A1 * 6/1996 ................ 704/240

OTHER PUBLICATIONS

Chen et al., "Clustering via the Bayesian Information Criterion with Applications in Speech Recognition," IBM, T.J. Watson Research Center.
Beigi et al., "A Distance Measure Between Collections of Distributions and its Application to Speaker Recognition," IBM, T.J. Watson Research Center.
Chen et al., "Speaker, Environment and Channel Change Detection and Clustering via the Bayesian Information Criterion," IBM, T.J. Watson Research Center.
Dharanipragada et al., "Experimental Results in Audio Indexing", IBM, T.J. Watson Research Center.
Neti et al., "Audio-Visual Speaker Recognition for Video Broadcast News," IBM, T.J. Watson Research Center.

(List continued on next page.)

Primary Examiner—Richemond Dorvil
Assistant Examiner—Donald L. Storm
(74) Attorney, Agent, or Firm—Ryan, Mason & Lewis, LLP; Thu Ann Dang, Esq.

(57) ABSTRACT

Methods and apparatus are disclosed for detecting non-target language references in an audio transcription or speech recognition system using a confidence score. The confidence score may be based on (i) a probabilistic engine score provided by a speech recognition system, (ii) additional scores based on background models, or (iii) a combination of the foregoing. The engine score provided by the speech recognition system for a given input speech utterance reflects the degree of acoustic and linguistic match of the utterance with the trained target language. The background models are created or trained based on speech data in other languages, which may or may not include the target language itself. A number of types of background language models may be employed for each modeled language, including one or more of (i) prosodic models; (ii) acoustic models; (iii) phonotactic models; and (iv) keyword spotting models. The engine score can be combined with the background model scores to normalize the engine score for non-target languages. The present invention identifies a non-target language utterance within an audio stream when the confidence score falls below a predefined criteria. A language rejection mechanism can interrupt or modify the transcription process when speech in the non-target language is detected.

17 Claims, 2 Drawing Sheets

OTHER PUBLICATIONS

Chen et al., "IBM's LVCSR System for Transcription of Broadcast News Used in the 1997 HUB4 English Evaluation," IBM, T.J. Watson Research Center.

Navratil et al., "Phonetic–Context Mapping in Language Identification," Proc. Of the EUROSPEECH–97, vol. 1, 71–74 (1997).

Navratil et al., An Efficient Phonotactic–Acoustic System for Language Identification, Proc. of the Int'l Conf. On Acoustics, Speech and Signal Processing (ICASSP), vol. 2, 781–84, Seattle, WA, IEEE (May, 1998).

Ramabhadran et al., Acoustics Only Based Automatic Phonetic Baseform Generation Proc. Of the Int'l Conf. On Acoustics, Speech and Signal Processing (ICASSP), Seattle, WA, IEEE (May, 1998).

* cited by examiner

METHODS AND APPARATUS FOR IDENTIFYING A NON-TARGET LANGUAGE IN A SPEECH RECOGNITION SYSTEM

FIELD OF THE INVENTION

The present invention relates to speech recognition systems and, more particularly, to methods and apparatus for detecting non-target languages in a monolingual speech recognition system.

BACKGROUND OF THE INVENTION

Speech recognition and audio indexing systems are generally developed for a specific target language. The lexica, grammar and acoustic models of such monolingual systems reflect the typical properties of the target language. In practice, however, these monolingual systems may be exposed to other non-target languages, leading to poor performance, including improper transcription or indexing, potential misinterpretations or false system reaction.

For example, many organizations, such as broadcast news organizations and information retrieval services, must process large amounts of audio information, for storage and retrieval purposes. Frequently, the audio information must be classified by subject or speaker name, or both. In order to classify audio information by subject, a speech recognition system initially transcribes the audio information into text for automated classification or indexing. Thereafter, the index can be used to perform query-document matching to return relevant documents to the user.

If the source audio information includes non-target language references, however, the speech recognition system may improperly transcribe the non-target language references, potentially leading to improper classification or indexing of the source information. A need therefore exists for a method and apparatus for detecting non-target language references in an audio transcription or speech recognition system.

With the trend in globalizing communication technologies and providing services to a wide, multilingual public, the ability to distinguish between languages has become increasingly important. The language-rejection problem is closely related to this ability and thus to the problem of automatic language identification (ALI). For a detailed discussion of automatic language identification techniques, see, for example, Y. K. Muthusamy et al., "Reviewing Automatic Language Identification," IEEE Signal Processing Magazine, 11(4):33–41 (October 1994); J. Navrátil and W. Zühlke, "Phonetic-Context Mapping in Language Identification," Proc. of the EUROSPEECH-97, Vol. 1, 71–74 (1997); and J. Navrátil and W. Zühilke, "An Efficient Phonotactic-Acoustic System for Language Identification," Proc. of the Int'l Conf. on Acoustics, Speech and Signal Processing (ICASSP), Vol. 2, 781–84, Seattle, Wash., IEEE (May, 1998), each incorporated by reference herein.

A number of automatic language identification techniques have been proposed or suggested for distinguishing languages based on various features contained in the speech signal. Several sources of language-discriminative information have been identified as relevant for the task of language identification including, for example, the prosody, the acoustics, and the grammatical and lexical structure. Automatic language identification techniques based on the prosody or acoustics of speech attempt to identify a given language based on typical melodic and pronunciation patterns, respectively.

Due to the complexity of automatic language identification techniques based on the grammatical and lexical structure, however, most proposals have advanced techniques based on acoustic-prosodic information or derived lexical features in order to represent the phonetic structure in a less complex manner. ALI techniques have been developed that model statistical dependencies inherent in phonetic chains, referred to as the phonotactics. In the statistical sense, phonotactics can be viewed as a subset of grammatical and lexical rules of a language. Since these rules differ among languages, the ability to discriminate among languages is naturally reflected in the phonotactic properties.

SUMMARY OF THE INVENTION

Generally, methods and apparatus are disclosed for detecting non-target language references in an audio transcription or speech recognition system using confidence scores. The confidence score may be based on (i) a probabilistic engine score provided by a speech recognition system, (ii) additional scores based on background models, or (iii) a combination of the foregoing. The engine score provided by the speech recognition system for a given input speech utterance reflects the degree of acoustic and linguistic match of the utterance with the trained target language. In one illustrative implementation, the probabilistic engine score provided by the speech recognition system is combined with the background model scores to normalize the engine score as well as to account for the potential presence of a non-target language. The normalization narrows the variability range of the scores across speakers and channels.

The present invention identifies a non-target language utterance within an audio stream when the confidence score falls below a predefined criteria. According to one aspect of the invention, a language rejection mechanism interrupts or modifies the transcription process when speech in the non-target language is detected. In this manner, the present invention prevents improper transcription and indexing and false interpretations of the speech recognition output.

In the presence of non-target language utterances, the transcription system is not able to find a good match based on its native vocabulary, language models and acoustic models. The resulting recognized text will have associated lower engine score values. Thus, the engine score alone may be used to identify a non-target language when the engine score is below a predefined threshold.

The background models are created or trained based on speech data in several languages, which may or may not include the target language itself. A number of types of background language models may be employed for each modeled language, including one or more of (i) prosodic models; (ii) acoustic models; (iii) phonotactic models; and (iv) keyword spotting models.

A more complete understanding of the present invention, as well as further features and advantages of the present invention, will be obtained by reference to the following detailed description and drawings.

DETAILED DESCRIPTION OF PREFERRED EMBODIMENTS

Figure 1:
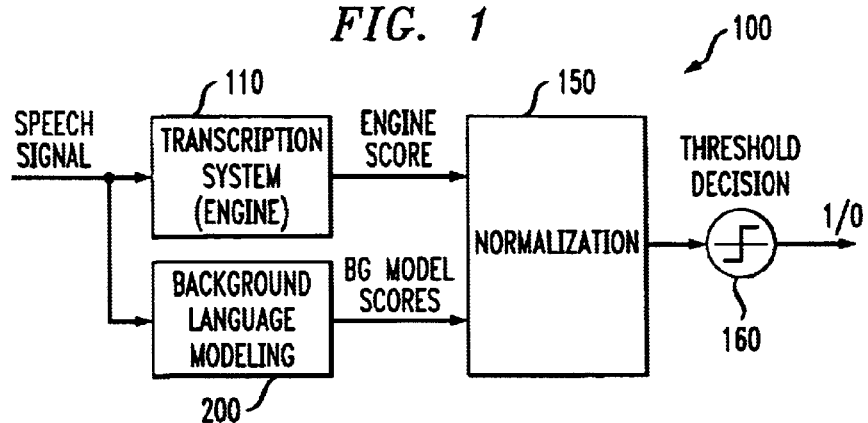
FIG. 1 illustrates a non-target language identification system in accordance with the present invention.

FIG. 1 illustrates a non-target language identification system 100 in accordance with the present invention. According to one feature of the present invention, a language rejection mechanism interrupts or modifies an otherwise conventional speech recognition process when speech in the non-target language is detected. In this manner, the present invention prevents improper transcription and indexing and false interpretations of the speech recognition output. The present invention employs probabilistic engine scores provided by a speech recognition system combined with additional scores based on background models to normalize the engine score for non-target languages.

As shown in FIG. 1, the non-target language identification system 100 includes a transcription system 110, a background language modeling module 200, discussed further below in conjunction with FIG. 2, a normalization module 150 and a threshold decision module 160. As discussed further below, the transcription system 110 transcribes a speech signal and provides an engine score indicating the degree of confidence in a given transcription. In addition, the background language modeling module 200 generates a background (BG) model score indicating the probabilities for the hypotheses that the given transcription is associated with (i) the target and (ii) with a non-target language. As discussed further below, the normalization module 150 integrates one or both of the engine and BG model scores and the threshold decision module 160 compares the integrated score to predefined criteria to determine if a given transcription is likely associated with a non-target language utterance.

ENGINE SCORE

The transcription system 110 may be embodied as any speech recognition or transcription system that provides a confidence score, such as the ViaVoice™ speech recognition system, commercially available from IBM Corporation of Armonk, N.Y. The transcription system 110 typically calculates a probabilistic engine score for the decoded audio stream given some set of acoustic model(s), pronunciation vocabulary and language model(s). In the monolingual environment of the present invention, these models are trained on one specific target language.

During speech recognition based on speech in the target language, the value of the engine score depends on the type of speech and the channel quality. Nonetheless, there is a strong correspondence between the recognized text and the acoustic evidence. In the presence of non-target language utterances, however, the transcription system 110 is not able to find a good match based on its native vocabulary, language models and acoustic models. Thus, the resulting recognized text will have associated lower engine score values. In this manner, the engine score alone may be used to identify a non-target language when the engine score is below a predefined threshold.

BACKGROUND MODELS SCORES

As previously indicated, the present invention supplements the engine scores provided by the transcription system 110 with additional scores based on background models. In this manner, the present invention improves the accuracy of identifying target and non-target language utterances using background models. The background models are created or trained based on speech data in other languages, which may or may not include the target language itself. For identification purposes, scores based on all of these background models are calculated and are then used to normalize the engine score. As discussed further below in a section entitled "NORMALIZATION," the normalization helps to narrow the variability range of the scores across speakers and channels.

Generally, the present invention utilizes a number of types of background language models for each non-target language to be modeled. The type of the background models should be diverse and should capture the properties of languages on the acoustic and linguistic level. The features used for training may range from amplitude and fundamental frequency measurements (prosodic models) to higher phonetic features, such as phone-level statistics (phonotactic models), partial or whole word keywords (keyword spotting models) up to full-fledged large-vocabulary recognizers.

Thus, the background language models may include one or more of (i) prosodic models; (ii) acoustic models; (iii) phonotactic models; and (iv) keyword spotting models. For a more detailed discussion of various types of models, see, for example, Y. K. Muthusamy et al., "Reviewing Automatic Language Identification," IEEE Signal Processing Magazine, 11(4):33–41 (October 1994); J. Navrátil and W. Zühlke, "Phonetic-Context Mapping in Language Identification," Proc. of the EUROSPEECH-97, Vol. 1, 71–74 (1997); and J. Navrátil and W. Zühlke, "An Efficient Phonotactic-Acoustic System for Language Identification," Proc. of the Int'l Conf. on Acoustics, Speech and Signal Processing (ICASSP), Vol. 2, 781–84, Seattle, Wash., IEEE (May, 1998), each incorporated by reference herein.

Figure 2:
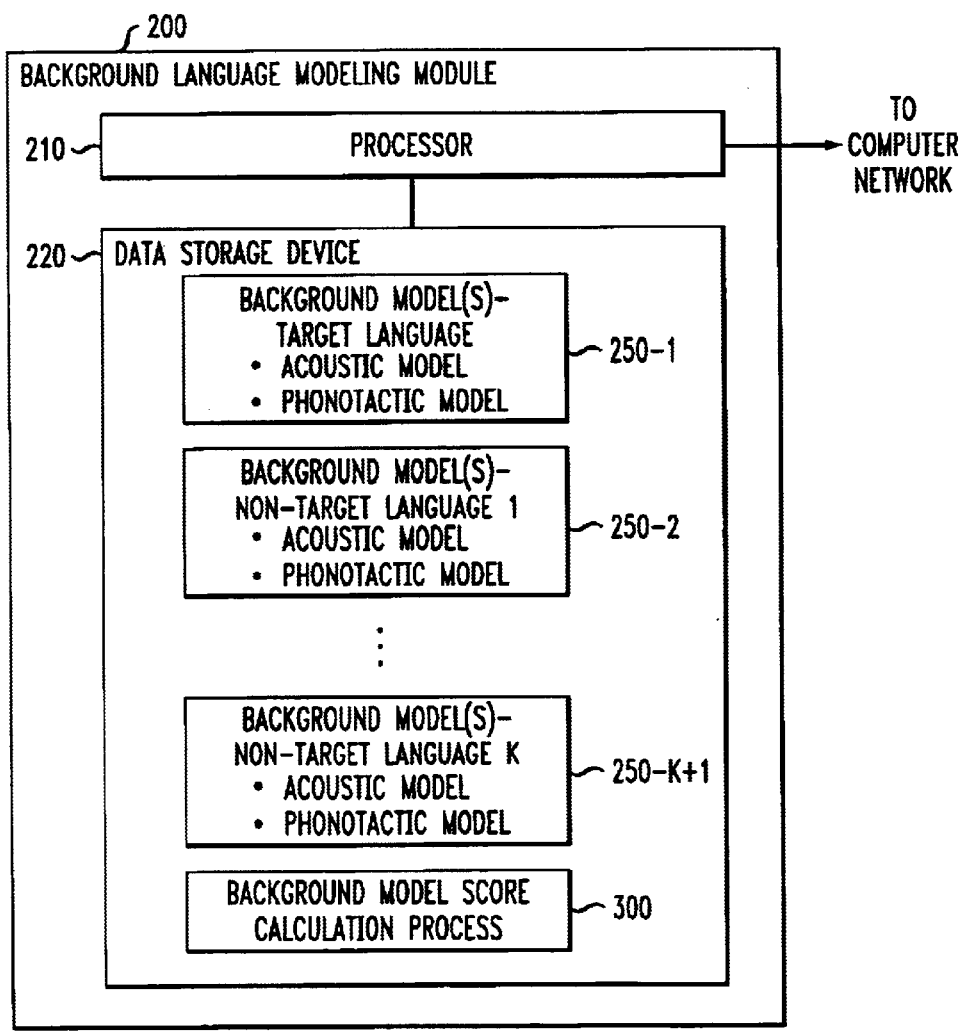
FIG. 2 is a schematic block diagram showing the architecture of an illustrative background language modeling module of FIG. 1.

FIG. 2 is a schematic block diagram showing the architecture of an illustrative background language modeling module 200 in accordance with the present invention. The background language modeling module 200 may be embodied as a general purpose computing system, such as the general purpose computing system shown in FIG. 2. The background language modeling module 200 includes a processor 210 and related memory, such as a data storage device 220, which may be distributed or local. The processor 210 may be embodied as a single processor, or a number of local or distributed processors operating in parallel. The data storage device 220 and/or a read only memory (ROM) are operable to store one or more instructions, which the processor 210 is operable to retrieve, interpret and execute. It is noted that the background language modeling module 200 may be integrated with the transcription system 110 shown in FIG. 1, or the background language modeling module 200 may be a stand-alone device, as shown in FIG. 2, as would be apparent to a person of ordinary skill in the art.

The data storage device 220 preferably includes a set of background models 250-1 for the target language and a set of background models 250-2 through 250-K for each modeled non-target language. As previously indicated, each set of background language models 250-K can include one or more of a (i) prosodic model; (ii) acoustic model; (iii) phonotactic model; and (iv) keyword spotting model. In one preferred embodiment, shown in FIG. 2, each set of background models includes acoustic and phonotactic models due to a favorable performance and cost ratio. In addition, as discussed further below in conjunction with FIG. 3, the data storage device 220 includes a background model score calculation process 300. The exemplary background model score calculation process 300 calculates a phonotactic-acoustic score for each background model.

It is noted that while the background models are trained on a certain set of languages, the normalization method of the present invention may contribute to improving the identification of a non-target language even for non-target languages that were not previously seen in the training data set.

CALCULATION OF BACKGROUND MODEL SCORE

Figure 3:
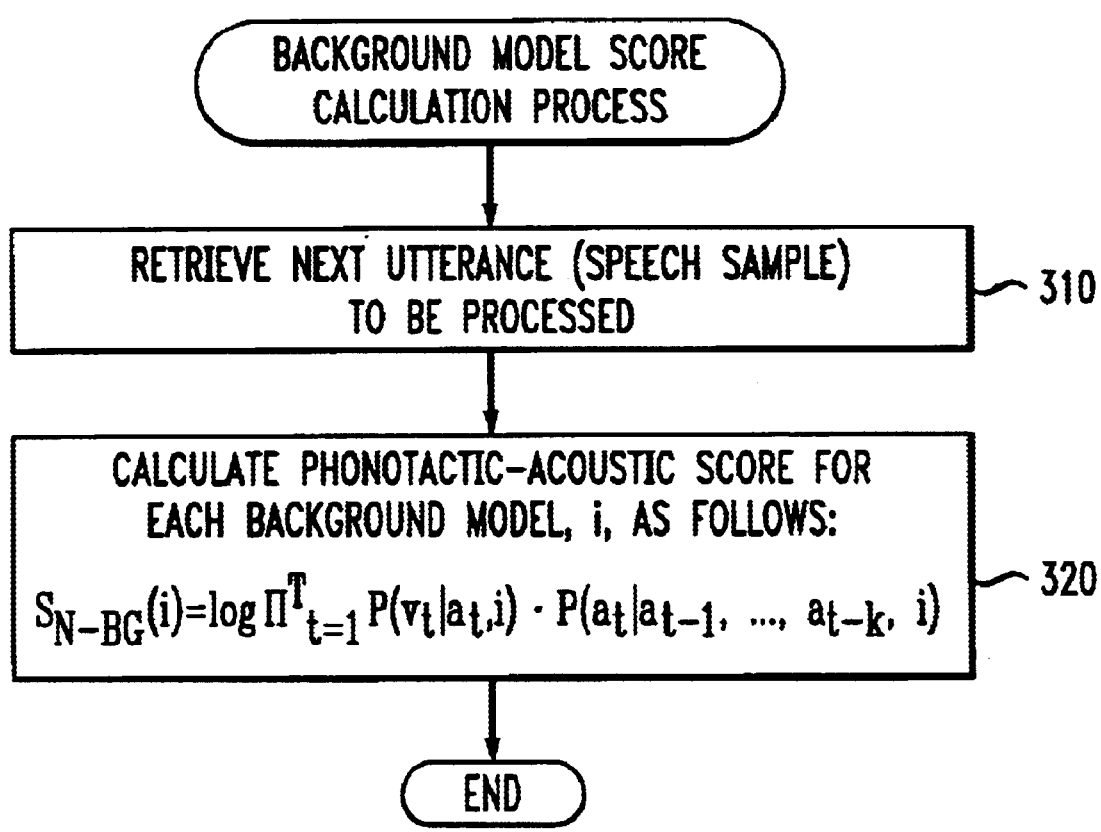
FIG. 3 is a flow chart describing an exemplary background model score calculation process employed by the background language modeling module of FIG. 2.

As previously indicated, the background language modeling module 200 executes a background model score calculation process 300 to calculate a score for each background model. FIG. 3 is a flow chart describing an exemplary background model score calculation process 300. It is again noted that the exemplary background model score calculation process 300 generates background model scores based on phonotactics (phone statistics) and acoustics.

As shown in FIG. 3, the background model score calculation process 300 initially retrieves the utterance (speech sample) during step 310. $S_{T\text{-}BG}$ denotes the background score for the target language and $S_{N\text{-}BG}(i)$ denotes the background score for the i-th non-target model. Thereafter, the phonotactic-acoustic score is calculated for each background model, i, during step 320 as follows:

$$S_{N\text{-}BG}(i) = \log \Pi_{t=1}^{T} P(v_t|a_t,i) \cdot P(a_t|a_{t-1}, \ldots, a_{t-k},i) \tag{1}$$

where $a_1, \ldots a_T$, denote a phone sequence obtained from a phone recognizer, such as a ballistic labeler, described for example, in U.S. patent application Ser. No. 09/015,150, or Ramabhadan et al., "Acoustics Only Based Automatic Phonetic Baseform Generation," Proc. of the Int'l Conf. on Acoustics, Speech and Signal Processing (ICASSP), Seattle, Wash. IEEE (May, 1998), each incorporated by reference herein. In addition, $v_t$ stands for the acoustic evidence (observation) within the speech segment of the phone $a_t$ and $P(a_t|a_{t-1}, \ldots, a_{t-k}, i)$ for a phonotactic model of the k-th order modeling (k+1)-tuples of phones in a sequence. It is noted that Equation (1) is one of many possible ways to obtain the phonotactic score, as would be apparent to a person of ordinary skill in the art. Alternative language modeling and language identification techniques may consist, for example, of calculating the phonotactic and acoustic scores separately and combining them in the log domain in a weighted manner. Furthermore, the phone duration information may be included, for example, using a Hidden Markov Model (HMM). The background score for the target language, $S_{T\text{-}BG}$, is also obtained using equation (1).

NORMALIZATION

Mathematically, the normalization performed by the normalization module 150 (FIG. 1) can be formulated in several ways. For example, if the engine and background scores are probabilistic, the normalization can be expressed as a ratio of the probability values of the target and non-target scores. Likewise, if the engine and background scores are expressed as log likelihoods, the normalization can be expressed as a difference between logarithmic scores of the target and non-target scores.

In the illustrative embodiment, $S_{T\text{-}E}$ denotes the engine target score, $S_{T\text{-}BG}$ denotes the background score for the target language and $S_{N\text{-}BG}(i)$ denotes the background score for the i-th non-target model. Thus, the normalized score, S, may be obtained as follows:

$$S = a_1 S_{T\text{-}E} + a_2 S_{T\text{-}BG} - \sum_{i=1}^{N} b_i \cdot S_{N\text{-}BG}(i) \tag{2}$$

where N is the number of background models, and $a_i$, $b_i$ are weights for the target and non-target scores, respectively. It is noted that the robustness of the model of the background languages increases in proportion to the number, N, of background models. Thus, the language repertoire should be chosen as large and wide-covering as possible. It is again noted that while the background models are trained on a certain set of languages, the normalization method of the present invention may contribute to improving the identification of a non-target language even for non-target languages that were not previously seen in the training data set.

REJECTION MECHANISM

As previously indicated, a non-target language utterance is identified based on the total normalized score, calculated in accordance with equation (2) and applying a threshold, T, as follows:

| | | |
|---|---|---|
| S − T ≧ 0 | Accept (Target Language) | (3) |
| S − T < 0 | Reject (Non-target Language) | |

Equation (3) leads to a positive or negative left side of the equation, resulting in acceptance or rejection of the utterance, respectively. The threshold value, T, may be obtained from a training stage and/or be derived in an adaptive manner from the current audio stream, as would be apparent to a person of ordinary skill in the art.

The normalized score measure, S, at a certain time during transcription may be calculated within a window taking into account a history of the likelihood values from a predetermined time period. For example, a mean value of the word-based likelihoods within a predefined period of time may be utilized.

In one application, the present invention may be employed as a language rejection mechanism to interrupt or modify the transcription system 110 when speech in the non-target language is detected. In other words, if the non-target language is detected in real-time using the present invention, then the speech recognition process can be suspended until the audio stream switches back to the target language. Performance of speech-based text retrieval systems depend heavily on the accuracy of the transcription. Generally, the higher the speech recognition accuracy, the better the performance of the information retrieval. In this manner, the present invention prevents improper transcription and indexing and false interpretations of the speech recognition output.

In a further variation, the non-target language identification system 100 may use a different threshold value, $T_{RESUME}$, for switching back to the target-language transcription after a previous rejection. The threshold value, $T_{RESUME}$, may be adaptive or. predetermined, as discussed above for the primary threshold value, T. In yet another variation, the present invention uses precomputed likelihoods (e.g., by-products) of the recognition process and low-computation background models.

It is to be understood that the embodiments and variations shown and described herein are merely illustrative of the principles of this invention and that various modifications may be implemented by those skilled in the art without departing from the scope and spirit of the invention.

What is claimed is:

1. A method for identifying a non-target language utterance in an audio stream, comprising the steps of:

transcribing each utterance in said audio stream using a transcription system trained on a target language;

generating a confidence score associated with each of said transcribed utterances; and identifying a transcribed utterance as being in a non-target language if said confidence score generated by said transcription system trained on a target language fails to meet predefined criteria.

2. The method of claim 1, wherein said confidence score is an engine score generated by said transcription system.

3. The method of claim 1, further comprising the step of interrupting said transcription system when said non-target language is detected.

4. The method of claim 1, further comprising the step of modifying said transcription system when said non-target language is detected.

5. The method of claim 1, wherein said confidence score is based on one or more background models trained on at least one non-target language.

6. The method of claim 5, wherein said background models include one or more of (i) prosodic models; (ii) acoustic models; (iii) phonotactic models; and (iv) keyword spotting models for each modeled language.

7. The method of claim 1, wherein said confidence score is based on an engine score provided by said transcription system combined with a background model score to normalize said engine score for said non-target language.

8. A method for identifying a non-target language utterance in an audio stream, comprising the steps of:

transcribing each utterance in said audio stream using a transcription system trained on a target language;

generating a confidence score associated with each of said transcribed utterances based on an engine score provided by said transcription system trained on a target language and at least one background model score; and identifying a transcribed utterance as being in a non-target language if said confidence score generated by said transcription system trained on a target language fails to meet predefined criteria.

9. The method of claim 8, further comprising the step of interrupting said transcription system when said non-target language is detected.

10. The method of claim 8, further comprising the step of modifying said transcription system when said non-target language is detected.

11. The method of claim 8, wherein said at least one background model is trained on at least one non-target language.

12. The method of claim 11, wherein said at least one background model includes one or more of (i) prosodic models; (ii) acoustic models; (iii) phonotactic models; and (iv) keyword spotting models for each modeled language.

13. The method of claim 8, wherein said confidence score normalizes said engine score for said non-target language.

14. A system for identifying a non-target language utterance in an audio stream, comprising:

a memory that stores computer-readable code; and a processor operatively coupled to said memory, said processor configured to implement said computer-readable code, said computer-readable code configured to:

transcribe each utterance in said audio stream using a transcription system trained on a target language;

generate a confidence score associated with each of said transcribed utterances; and identify a transcribed utterance as being in a non-target language if said confidence score generated by said transcription system trained on a target language fails to meet predefined criteria.

15. A system for identifying a non-target language utterance in an audio stream, comprising:

a memory that stores computer-readable code; and a processor operatively coupled to said memory, said processor configured to implement said computer-readable code, said computer-readable code configured to:

transcribe each utterance in said audio stream using a transcription system trained on a target language;

generate a confidence score associated with each of said transcribed utterances based on an engine score provided by said transcription system trained on a target language and at least one background model score; and identify a transcribed utterance as being in a non-target language if said confidence score generated by said transcription system trained on a target language fails to meet predefined criteria.

16. An article of manufacture for identifying a non-target language utterance in an audio stream, comprising:

a computer readable medium having computer readable code means embodied thereon, said computer readable program code means comprising:

a step to transcribe each utterance in said audio stream using a transcription system trained on a target language;

a step to generate a confidence score associated with each of said transcribed utterances; and a step to identify a transcribed utterance as being in a non-target language if said confidence score generated by said transcription system trained on a target language fails to meet predefined criteria.

17. An article of manufacture for identifying a non-target language utterance in an audio stream, comprising:

a computer readable medium having computer readable code means embodied thereon, said computer readable program code means comprising:

a step to transcribe each utterance in said audio stream using a transcription system trained on a target language;

a step to generate a confidence score associated with each of said transcribed utterances based on an engine score provided by said transcription system trained on a target language and at least one background model score; and a step to identify a transcribed utterance as being in a non-target language if said confidence score generated by said transcription system trained on a target language fails to meet predefined criteria.

* * * * *